United States Patent [19]

Hansen

[11] Patent Number: 4,462,541

[45] Date of Patent: Jul. 31, 1984

[54] CONSTANT TEMPERATURE CONTROL FOR A VEHICLE COMPARTMENT HEATER OR HEATER-AIR-CONDITIONER

[75] Inventor: Gary P. Hansen, Federal Way, Wash.

[73] Assignee: Red Dot Corporation, Seattle, Wash.

[21] Appl. No.: 422,710

[22] Filed: Sep. 24, 1982

[51] Int. Cl.³ .............................................. G05D 23/00
[52] U.S. Cl. ................................. 237/2 A; 237/12.3 B; 237/12.3 A; 236/91 F; 236/DIG. 2; 137/487.5; 251/27; 251/61.4; 165/39
[58] Field of Search ............. 237/2 A, 12.3 A, 12.3 B; 236/91 F, DIG. 2; 137/487.5, 468, 492.5; 251/61.4, 27; 165/39

[56] References Cited

U.S. PATENT DOCUMENTS

| | | | |
|---|---|---|---|
| 2,615,468 | 10/1952 | Woolley | 251/61.4 |
| 3,702,431 | 11/1972 | Pinckaer | 318/471 |
| 3,725,644 | 4/1973 | Bailey | 219/494 |
| 3,814,957 | 6/1974 | Way | 307/310 |
| 3,833,859 | 9/1974 | Carlson | 330/69 |
| 3,860,837 | 1/1975 | Carlson | 307/310 |
| 4,034,235 | 7/1977 | Wade | 307/117 |
| 4,186,315 | 1/1980 | Benton | 307/117 |
| 4,193,006 | 3/1980 | Kabat et al. | 307/117 |
| 4,227,569 | 10/1980 | Wattin | 237/12.3 A |

FOREIGN PATENT DOCUMENTS

| | | | |
|---|---|---|---|
| 609081 | 1/1926 | France | 251/27 |
| 2019616 | 10/1979 | United Kingdom | 236/91 F |

Primary Examiner—Albert J. Makay
Assistant Examiner—Henry Bennett
Attorney, Agent, or Firm—Delbert J. Barnard

[57] ABSTRACT

A desired temperature within the passenger comprartment (10) of a motor vehicle is selected by occupant movement of a control lever (80) for a variable resistor (VR2). The temperature of conditioning air being supplied to the compartment is measured by a thermister (72). The two temperatures are electronically compared. If the measured temperature is higher than the selected temperature, a solenoid (62) is energized which moves a control valve (48) in a position allowing passage of pressurized air into an air cylinder (26). The air cylinder (26) functions to close a valve (22) in a water line (18, 20) which extends from the engine cooling system to a heat exchanger (24) located within the conditioning air duct (12). When the temperature of the conditioning air falls below the selected temperature level, the solenoid (62) is de-energized and a spring (54) moves the control valve (58) into a position in which it blocks flow of compressed air to the air cylinder (26) and vents the air cylinder to the atmosphere. A spring (34) in the vented air cylinder (26) moves the valve (22) in the water line to an open position. Hot water from the engine cooling system is then able to flow into the heat exchanger (24) and heat the conditioning air.

7 Claims, 3 Drawing Figures

CONSTANT TEMPERATURE CONTROL FOR A VEHICLE COMPARTMENT HEATER OR HEATER-AIR-CONDITIONER

DESCRIPTION

1. Technical Field

This invention relates to improvements in vehicle passenger compartment heater systems.

2. Background Art

In vehicles powered by water cooled engines, it is well known to pass heated cooling water into heat exchange with air and then direct the air into the vehicle passenger compartment for heating the compartment. Temperature control is in some installations provided by means of a modulating valve in the water line, operable to control the amount of water flow through the heat exchanger. In other installations, temperature control is provided by means of a valve in the air duct. The valve is opened a small amount to allow the passage of a small amount of the heated air into the compartment. It is opened a larger amount to allow a larger amount of heated air into the compartment. It is closed to block the flow of air into the compartment when heating is either not required or desired.

The passenger compartment temperature conditioning system of the present invention takes a different approach. A blower and duct system is provided to deliver air into the vehicle passenger compartment. The temperature of the air in the delivery duct is sensed and compared with a desired temperature which is selected by the user. If the sensed temperature is below the desired temperature, a control valve is opened in a branch of the engine cooling system and hot cooling water from the engine is passed through a heat exchanger which is located in the air supply duct. If the sensed temperature is higher than the selected temperature, the valve is closed. The valve is opened and closed by energizing and de-energizing a solenoid. A quite simple electronic control system makes the comparison between the measured and selected temperatures and energizes and de-energizes the solenoid.

The following patents show electronic control systems for heating system valves and the like which are present in the patent literature:

U.S. Pat. No. 3,702,431 granted Nov. 7, 1972, to Balthasar H. Pinckaers; U.S. Pat. No. 3,725,644, granted Apr. 3, 1973, to Ronald L. Bailey; U.S. Pat. No. 3,814,957, granted June 4, 1974, to Allan S. Way; U.S. Pat. No. 3,818,183, granted June 18, 1974, to J. Gilbert Masson; U.S. Pat. No. 3,833,859, granted Sep. 3, 1974, to Elmer A. Carlson; U.S. Pat. No. 3,860,837, granted Jan. 14, 1975, to Elmer A. Carlson; U.S. Pat. No. 4,034,235, granted July 5, 1977, to Kenneth R. Wade and U.S. Pat. No. 4,186,315, granted Jan. 29, 1980, to Ronald Benton.

These patents and the other prior listed in them should be consulted for the purpose of properly evaluating the subject invention and putting it into proper perspective relative to the prior art.

DISCLOSURE OF THE INVENTION

The temperature control system of the present invention comprises a duct for delivering conditioning air into a region to be temperature conditioned by such air. A conduit is provided to deliver hot liquid in a heat exchanging relation with the conditioning air in the duct. An off-on valve is located in the conduit. A temperature level selector is provided for selecting a desired temperature in the region to be temperature conditioned. A temperature sensor is positioned to measure the temperature of the conditioning air. A controller is provided which functions in response to a difference between the selected temperature and the sensed temperature level for moving the off-on valve into a fully closed position when the temperature of the conditioning air is higher than the selected temperature level and moving the off-on valve into a fully open position when the selected temperature is higher than the temperature of the conditioning air.

In preferred form, the off-on valve in the conduit is normally open. The off-on valve includes a valve orifice and a valve plug movable into the valve orifice, for closing the valve, and outfrom the valve orifice for opening the valve. A spring normally biases the valve plug into an open position. An air cylinder, operable in opposition to the spring, is provided for moving the valve plug into a closed position. Owing to this arrangement, if there is ever a malfunction in the control system, the spring will operate to hold the off-on valve open, permitting circulation of water through the water system.

According to an aspect of the invention, the control system for the air cylinder comprises a conduit leading from a source of compressed air to the air cylinder. A three-way valve is located in the conduit. Such valve has a first position in which it vents the air cylinder to the atmosphere and blocks flow from the source of compressed air, and a second position in which it connects the air cylinder to the source of compressed air and blocks flow to the atmosphere. Preferably, the three-way valve is normally biased into its first position so that the off-on valve will be in an open position in the event of a malfunction of the control system or the three-way valve.

In accordance with an aspect of the invention, an electrical solenoid is provided for shifting the three-way valve from its first position into its second position.

These and other objects, features, advantage and characteristics of the invention will be apparent from the following detailed description of a typical embodiment of the invention in which reference is made to the accompanying drawings.

BRIEF DESCRIPTION OF THE DRAWINGS

In the drawings, like element designations refer to like parts throughout, and.

BEST MODE FOR CARRYING OUT THE INVENTION

Figure 1:
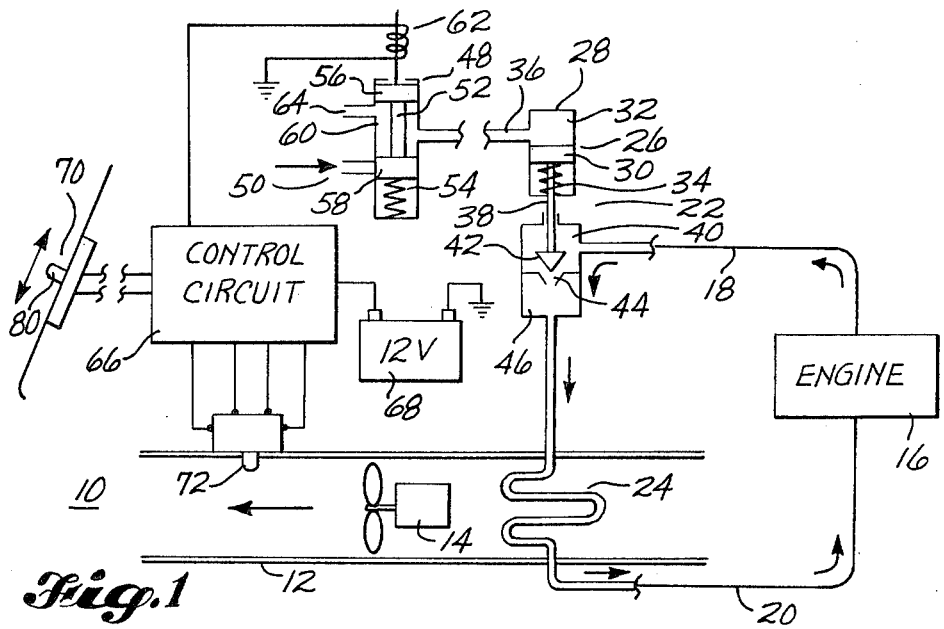
FIG. 1 is a schematic diagram of an embodiment of the constant temperature control system of the present invention.

Referring to FIG. 1, a region to be temperature conditioned is designated by the numeral 10. By way of example, this may be the passenger compartment of a truck or other motor vehicle. Temperature conditioned air is delivered through a suitable duct structure 12 into the region 10. The air entering the duct structure 12 may be outside air, recirculated air, or a combination of both. The air may be moved through the duct 12 by means of a fan or blower 14, shown schematically in FIG. 1. The type of fan and its specific location in the system can vary from one installation to the next.

While in the duct 12, the air is passed into a heat exchanging relationship with a circulating hot liquid. By way of typical and therefore non-limitive example, the liquid may be cooling system water which passes through the vehicle engine 16. The essential parts of the system are the engine 16, in which the circulating water is heated, and a circulating water conduit 18, 20. Of course, this circuit may also include a standard vehicle radiator (not shown).

The water conduit 18, 20 includes an off-on control valve 22, shown positioned upstream of the region 24 in which the water passes in a heat exchanging relationship with the conditioning air.

Preferably, the off-on valve 22 is controlled by means of a single acting air cylinder 26. Cylinder 26 comprises a housing 28 and a piston 30 within the housing 28. An air chamber 32 is defined on one side of the piston 30. A spring 34 is located on the opposite side of the piston 30. A combined inlet-outlet 36 delivers air into and outfrom chamber 32. A valve plug control rod 38 is connected to the piston 30 and extends through an opening into a valve chamber 40. A valve plug 42 is provided at the end of the rod 38. A valve orifice 44 is provided within valve housing 40 between inlet chamber 46.

Spring 34 normally biases the valve 42 into an open position. The control orifice 44 is closed by introducing fluid through passage 36 into chamber 32. A fluid entering chamber 32 exerts a force on the piston 30, moving the piston against the spring until the valve plug 42 has become seated in and closed the control orifice 44. This compresses the spring 34. When the air is removed from chamber 32, the energy stored in the compressed spring 44 returns the piston 30 to its retracted position, moving valve plug 42 outfrom the control orifice 44.

An off-on valve 48 is located between a conduit 50, leading from a source of compressed air, and the conduit 36. Valve 48 contains a valve spool 52 which is normally biased into a position in which it blocks flow from conduit 50 to conduit 36, by means of a spring 54. Valve spool 52 is shown to comprise two lands 56, 58 separated by a galley region 60. In the position shown, land 58 blocks flow from conduit 50 to conduit 36.

A solenoid 62 is provided for moving the valve spool 52 in opposition to the spring 54. Endwise movement of spool 52 in opposition to spring 54 moves land 58 away from conduit 50 and land 56 into a position blocking flow outfrom an exhaust passageway 64. Following such movement of the valve spool 52, air pressure in conduit 50 will be communicated via galley 60 and conduit 36 to the interior of chamber 32. As earlier explained, air entering chamber 32 will exert a force on the piston 30, causing it to move the valve plug 42 into a valve closing position. When solenoid 62 is de-energized, the spring 54 moves the valve spool 52 back into the position that is illustrated. Land 58 moves back into a position blocking flow from conduit 50 to conduit 36. Chamber 32 is now vented via conduit 36, the galley region 60 of the valve 48, and the exhaust passageway 64, to the atmosphere. Spring 34 then functions to retract the piston 30, to in that manner retract valve plug 42, opening orifice 44.

A control circuit or controller 66 is provided for energizing and deenergizing the solenoid 62. Control circuit 66 receives its electrical energy from a storage battery 68. It also receives control signals from two sources. The first is a temperature level selector 70 which is most likely located within the region 10, in a position to be controlled by a person wishing to establish a particular temperature within the region 10. The second input comes from a temperature sensor 72 which is positioned to measure the temperature of the conditioning air.

In basic operation, the control circuit 66 compares the temperature of the conditioning air entering region 10 with the selected temperature and in response to a difference in the two temperatures operates the valves 48, 26 to cause a change in the temperature of the conditioning air. Off-on valve 26 is moved to a fully closed position when the temperature of the conditioning air is higher than the selected temperature level, and is moved to a fully open position when the selected temperature level is higher than the temperature of the conditioning air.

Figure 2:
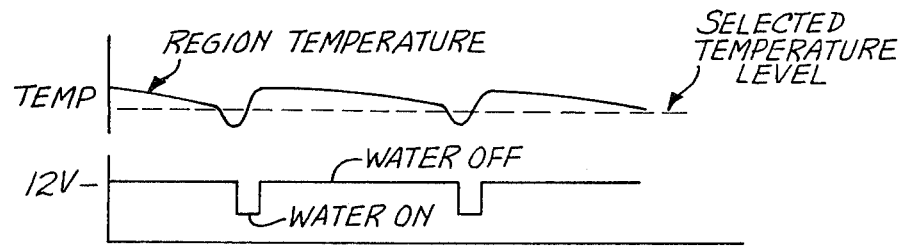
FIG. 2 is a graph of temperature and time matched with a diagram showing the off-on positions of the hot liquid control valve over the same time period.
Figure 3:
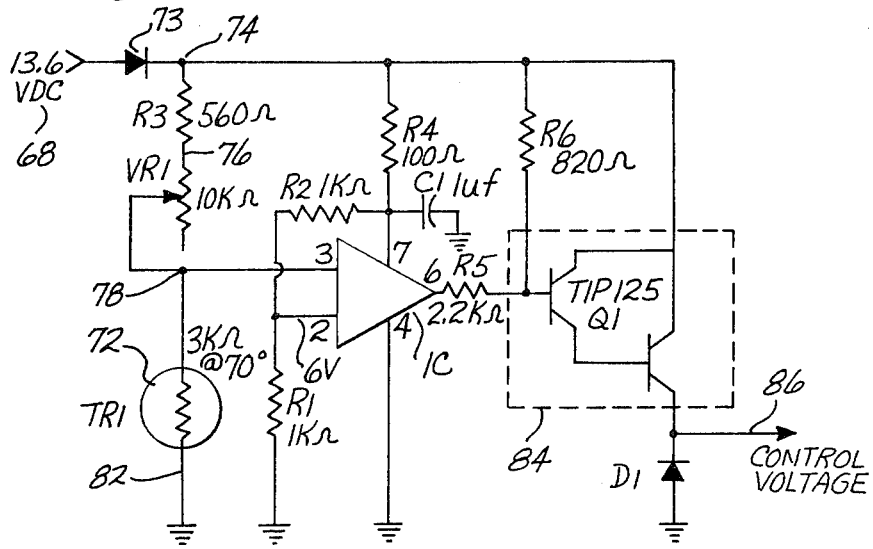
FIG. 3 is an electrical schematic diagram of the control circuit portion of the preferred embodiment.

Referring to FIG. 2, the battery or VDC is again designated 68. A diode 72 is located between the VDC 66 and a junction 74. A fixed resistor R3 and a variable resistor VR1 are located in a conductor 76 between junction 74 and a junction 78. Variable resistor VR1 is a part of the temperature selector 68. Temperature selector 68 may be positioned on the dashboard of the vehicle and may include a sliding or swinging control arm 80, the movement of which changes the position of variable resistor VR1. The variable resistor VR1 transfers the specific position of the control lever 80 into a voltage level at junction 78.

Temperature sensor 72 is a temperature sensitive resistor or "thermistor". As is well known, when the temperature of a thermistor increases, the thermistors resistance will decrease. It is located in conductor 82 which is grounded at one end and connected to junction 78 at its opposite end.

The control circuit maintains a six volt level at terminal 2 of integrated circuit IC. The voltage level at junction 78, is connected to terminal 3 of integrated circuit IC. It may vary between about 2.24–9.5 volts.

If the conditioning air is too warm, the voltage at terminal three will be above 6 volts. Integrated circuit IC will trigger a power transistor 84, causing it to send a control voltage to the solenoid 62 via conductor 86.

As earlier explained, energization of the solenoid 62 results in compressed air being delivered into the air cylinder 26, and a movement of the valve plug 46 into a position closing orifice 44 in valve 22. When valve orifice 44 is closed, hot water will not flow to the heat exchanger 24. As shown graphically by FIG. 2, the temperature of the conditioning air will steadily drop until its control on thermister 72 will produce a new voltage at juncture 73 and terminal 3 of the integrated circuit IC which is less than six volts. Integrated circuit IC will send a new signal to power transistor 84, causing the power transistor 84 to close and deenergize the solenoid 62. As earlier described, this will result in spring 56 moving the three-way control valve 48 into a position in which air pressure is vented from chamber 32 and the spring 34 retracts the valve plug 42 out of the control orifice 44. This allows hot water to once again flow into the heat exchanger 24.

Assuming that the disclosed system is used to maintain the output air temperature of a vehicle passenger compartment heater or heater-air-conditioner at a preselected level, the operation of the system will now be described:

The occupant of the vehicle cab or compartment 10 selects a desired temperature by positioning the control lever 80 of the dash mounted control mechanism 70. The control 70 may include a temperature scale so that all the operator has to do is move the control lever 80 along a temperature scale mounted adjacent the level 80, to a numerical value corresponding to the desired temperature level, e.g. a 70° F. marking. Movement of the lever 80 operates the variable resistor VR1 to establish a particular voltage level at junction 78. The voltage level set by positioning the lever 80 is compared with a voltage level signal received from the temperature sensor 72. As earlier explained, as the temperature sensed at 72 increases, the resistance of the thermistor 72 will decrease, effecting the value of the summed voltage at 78. In this manner, the circuit compares the two voltage levels and determines if the output temperature of the heater (as measured by the thermistor 72) is above or below the set level (established by a setting of variable resistor VR1). If the measured air temperature is above the selected temperature level the control system will operate to energize the solenoid 62. If the air temperature is below the selected level, the control system will operate to de-energize the solenoid 62. When the solenoid 62 is energized, it functions to reposition valve spool 52, so that pressurized air in conduit 50 can flow into the air cylinder chamber 32 and exert a force on piston 30, moving valve plug member 42 into a seated position closing the orifice 44 and stopping the flow of water through the heat exchanger 24. When the solenoid is de-energized, the spring 54 in valve 48 returns valve spool 52 to a position locking the flow of compressed air from line 50 and connecting air cylinder chamber 32 with the atmosphere. This venting of chamber 32 allows spring 34 to move piston 30 in a direction unseating valve plug 42 from the control orifice 44, again allowing hot water to flow through the heat exchanger 24.

As shown by FIG. 2, the system is off a substantially longer amount of time than it is on. A typical time during a moderately sold day would be about four seconds off (allowing water flow) and about forty seconds on (not allowing water flow). Since the water control valve 26 is either entirely open or entirely closed, the system has a fast response. The system will typically control the temperature of the conditioning air to within plus or minus 2° F.

Referring again to FIG. 2, which is a workable circuit diagram for an example embodiment of the invention, resistors R1 and R2 establish a 6 volt level at terminal 2 of integrated circuit IC. The inclusion of fixed resistor R3 in conductor 76 establishes a scale range of 40° F. to 140° F. A temperature level within this range is selected by movement of the control lever 80 for the variable resistor VR1. Resistor R4 protects against a surge voltage during start-up. Capacitor C1 functions as a filter. It keeps the circuit voltage smooth. Resistor R5 is a buffer. It establishes the current output of the integrated circuit IC at a reasonable level. Resistor R6 is a pull-up resistor. It pulls the input voltage of the power transistor up to the line voltage. Diode D1 allows conductor 86 to short to ground in the event its voltage becomes negative.

I claim:

1. A temperature control system, comprising:
    duct means for delivering conditioning air to a region to be temperature conditioned by said air;
    conduit means for delivering a hot liquid in a heat exchanging relation with the conditioning air in said duct means; and
    means for maintaining the temperature of the conditioning air at a selected value, comprising:
    a normally open off-on valve in said conduit means, said off-on valve including a valve orifice, a valve plug moveable into the valve orifice for closing the valve, and out from the valve orifice for opening the valve, with spring means normally biasing the valve plug into an open position, and air cylinder means operable in opposition to the spring, for moving the valve plug into a closed position;
    a temperature level selector means for the region to be temperature conditioned;
    temperature sensing means for sensing the temperature of the conditioning air; and
    control means responsive to a difference between the selected temperature level and the sensed temperature for moving the off-on valve into a fully closed position when the temperature of the conditioning air is higher than the selected temperature level, and moving the off-on valve into a fully open position when the selected temperature level is higher than the temperature of the conditioning air, said control means comprising a source of air under pressure, conduit means leading from such source to the air cylinder means, and a three-way valve in said conduit means, having a first position in which the air cylinder is vented to the atmosphere and flow from the source of compressed air to the air cylinder is blocked, and a second position in which passage to the atmosphere is blocked and flow is from the source of compressed air into the air cylinder, and means normally biasing the three-way valve into said first position.

2. A temperature control system for a passenger compartment of a motor vehicle of a type having a water cooled engine, comprising:
    duct means for delivering conditioning air into the passenger compartment of the vehicle;
    conduit means for delivering hot water from the water cooled engine into a heat exchanging relation with the conditioning air in said duct means; and
    means for maintaining the temperature of the conditioning air at a selected value, comprising:
    a normally open off-on valve in said conduit means said off-on valve including a valve orifice, a valve plug moveable into the valve orifice for closing the valve, and out from the valve orifice for opening the valve, with spring means normally biasing the valve plug into an open position, and air cylinder means operable in opposition to the spring, for moving the valve plug into a closed position;
    a temperature level selector means located in the passenger compartment of the vehicle;
    temperature sensing means for sensing the temperature of the conditioning air; and
    control means responsive to a difference between the selected temperature level and the sensed temperature for moving the off-on valve to a fully closed position when the temperature of the conditioning air is higher than the selected temperature level, and moving the off-on valve to a fully open position when the selected temperature level is higher than the temperature of the conditioning air, said control means comprising a source of air under pressure, conduit means leading from such source to the air cylinder means, and a three-way valve in said conduit means, having a first position in which the air cylinder is vented to the atmosphere and flow from the source of compressed air to the air cylinder is blocked, and a second position in which passage to the atmosphere is blocked and flow is from the source of compressed air into the air cylinder, and means normally biasing the three-way valve into said first position.

3. A temperature control system in accordance with claim 1, comprising a spring for normally biasing the three-way valve into said first position.

4. A temperature control system in accordance with claim 1, comprising solenoid means for shifting the three-way valve from its first position to its second position.

5. A temperature control system in accordance with claim 2, comprising a spring for normally biasing the three-way valve into said first position.

6. A temperature control system in accordance with claim 2, comprising solenoid means for shifting the three-way valve from its first position to its second position.

7. A temperature control system according to claim 6, wherein the temperature level selector means includes variable resistor means for changing the value of a voltage delivered to a junction in an electronic control circuit and the temperature sensing means is a thermister connected to deliver a voltage signal to the same junction, and wherein the means responsive to a difference between the selected temperature level and the sensed temperature comprises an integrated circuit which compares the summed voltage at the junction with a base voltage, and transistor means connected to the integrated circuit, operable by a signal from the integrated circuit to open and send a control voltage to the electrical solenoid when the sensed temperature level is above the selected temperature level, and to close and disconnect the control voltage from the solenoid when the sensed temperature level is below the selected temperature level.

* * * * *